United States Patent
McCaffrey et al.

(10) Patent No.: US 10,280,782 B2
(45) Date of Patent: May 7, 2019

(54) SEGMENTED CLEARANCE CONTROL RING

(71) Applicant: UNITED TECHNOLOGIES CORPORATION, Farmington, CT (US)

(72) Inventors: Michael G. McCaffrey, Windsor, CT (US); Igor S. Garcia, East Hartford, CT (US); John R. Farris, Bolton, CT (US); Brian R. Pelletier, Berwick, ME (US); Thomas Almy, Rocky Hill, CT (US); Brandon T. Rouse, Anacortes, WA (US); Mark Borja, Palm Beach Gardens, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 337 days.

(21) Appl. No.: 14/759,317

(22) PCT Filed: Feb. 26, 2013

(86) PCT No.: PCT/US2013/027773
§ 371 (c)(1),
(2) Date: Jul. 6, 2015

(87) PCT Pub. No.: WO2014/133483
PCT Pub. Date: Sep. 4, 2014

(65) Prior Publication Data
US 2015/0337673 A1 Nov. 26, 2015

(51) Int. Cl.
*F01D 11/14* (2006.01)
*F01D 11/08* (2006.01)
(Continued)

(52) U.S. Cl.
CPC ............ *F01D 11/08* (2013.01); *B23P 19/00* (2013.01); *F01D 9/04* (2013.01); *F01D 11/20* (2013.01);
(Continued)

(58) Field of Classification Search
CPC .......................... F05D 2240/11; F01D 11/14
See application file for complete search history.

(56) References Cited

U.S. PATENT DOCUMENTS 3,085,398 A * 4/1963 James ............... F01D 11/22
415/127
6,935,836 B2 * 8/2005 Ress, Jr. ........... F01D 11/025
415/173.2

(Continued)

OTHER PUBLICATIONS

International Search Report and Written Opinion for related International Application No. PCT/US13/27773; dated Feb. 26, 2013.

*Primary Examiner* — Woody A Lee, Jr.
*Assistant Examiner* — Jason A Fountain
(74) *Attorney, Agent, or Firm* — Cantor Colburn LLP

(57) ABSTRACT

A clearance control ring having at least two segments is disclosed. Each of the segments interlock with adjacent segments to form a full hoop clearance control ring. Separate carriers and seals or one-piece carriers and seals may be mounted on the clearance control ring. The segmented structure of the clearance control ring allows for simpler assembly with segmented cases for gas turbine engines than prior art one-piece clearance control rings. The segmented structure also may be used with one-piece pre-assembled and multi-stage rotors.

19 Claims, 5 Drawing Sheets

(51) Int. Cl.
*F01D 9/04* (2006.01)
*B23P 19/00* (2006.01)
*F01D 11/20* (2006.01)
*F01D 25/24* (2006.01)

(52) U.S. Cl.
CPC ....... *F01D 25/246* (2013.01); *Y10T 29/49325* (2015.01)

(56) References Cited

U.S. PATENT DOCUMENTS

| | | | |
|---|---|---|---|
| 7,422,413 B2 * | 9/2008 | Matheny | F01D 11/22 415/1 |
| 7,596,954 B2 | 10/2009 | Penda et al. | |
| 7,686,575 B2 * | 3/2010 | Chehab | F01D 11/18 29/889.22 |
| 8,206,085 B2 * | 6/2012 | Ammann | F01D 9/04 415/136 |
| 8,206,092 B2 | 6/2012 | Tholen et al. | |
| 8,790,067 B2 * | 7/2014 | McCaffrey | F01D 11/18 415/1 |
| 9,976,435 B2 * | 5/2018 | Borja | F01D 5/02 |
| 2009/0148277 A1 * | 6/2009 | Tholen | F01D 11/025 415/173.1 |
| 2009/0324393 A1 * | 12/2009 | Gonzalez | F01D 11/08 415/170.1 |
| 2012/0275898 A1 | 11/2012 | McCaffrey et al. | |
| 2016/0177768 A1 * | 6/2016 | Borja | F01D 5/02 415/134 |

\* cited by examiner

SEGMENTED CLEARANCE CONTROL RING

CROSS-REFERENCE TO RELATED APPLICATION

This application is a US National Stage under 35 USC § 371 of International Patent Application No. PCT/US2013/027773 filed on Feb. 26, 2013

FIELD OF THE DISCLOSURE

The present disclosure generally relates to gas turbine engines and, more specifically, to clearance control rings for rotors of gas turbine engines.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. In many gas turbine engines a fan rotates to draw air into the engine; however, the fan is not a necessity for all gas turbine engines. A compressor section, having low and high pressure compressors in dual-spool compressor designs, has a plurality of axially aligned stages. Each of these stages includes a rotor, having a plurality of radially outwardly extending and rotating blades, and a stator, having a plurality of radially inwardly extending and stationary vanes. The rotor of each stage compresses air, while the stator realigns the air for optimal compression by the next stage. The compressed air flows from the compressor section through a diffuser, to be slowed, and into the combustor, where it is split. A portion of the air is used to cool the combustor while the rest is mixed with a fuel and ignited.

An igniter generates an electrical spark in the combustor to ignite the air-fuel mixture. The products of the combustion then travel out of the combustor as exhaust and into a turbine section. The turbine section, having low and high pressure turbines in dual-spool turbine designs, also has a plurality of axially aligned stages. Similar to the compressor, each of the turbine stages includes a stator, having a plurality of radially inwardly extending stationary vanes, and a rotor, having a plurality of radially outwardly extending and rotating blades. Each rotor of the turbine is forced to rotate as the exhaust impinges upon the blades, while each stator re-aligns the exhaust for optimal impingement upon the rotor of the next turbine stage. The fan, compressor section, and turbine section are connected by concentrically mounted engine shafts running through the center of the engine. Thus, as the turbine rotors are rotated by the exhaust, the fan and corresponding compressor rotors are also rotated to bring in and compress new air. Once started, it can thereby be seen that this process is self-sustaining.

Seals surround the rotors of the compressors and turbines to reduce the air/exhaust bypassing the blades of these rotors. Air which bypasses the compressor rotors is not properly compressed and therefore hampers combustion, while exhaust which bypasses the turbine rotors reduces engine efficiency as energy is not fully extracted from the bypassing exhaust. Thus, the seals must be as close as possible to the blades of these rotors without touching the blades, as such contact would damage the seals and blades and possibly hamper rotation, while excessive spacing would allow more air/exhaust to bypass the rotor than is desired, thereby hampering combustion and efficiency. However, maintaining this close seal is difficult since the diameters of these rotors change throughout the operation of the engine. Thermal growth due to varying temperatures in the air/exhaust, as well as centrifugal growth due to varying rotational speeds, causes the diameter of the rotors to change during operation.

In an effort to match the growth of the engine rotors during operation, clearance control rings have been developed to maintain the close seals necessary for optimum engine operation. While effective, many rotors have segmented cases surrounding the rotors to facilitate easier assembly of, and maintenance on, the rotors. Current clearance control rings, however, negate many of the benefits of such segmented cases since the current clearance control rings are of full hoop designs, and therefore require stage-by-stage assembly and disassembly. It can thus be seen that a need exists for a clearance control ring which can maintain a close seal with an active rotor, while not negating the advantages of the segmented rotor case.

SUMMARY OF THE DISCLOSURE

In accordance with one aspect of the disclosure, a clearance control ring for a rotor is disclosed. The clearance control ring may include a first controlling segment and a second control ring interlocked with the first control ring segment of the clearance control ring to form a full hoop clearance control ring.

In a refinement, the clearance control ring may include additional control ring segments, each segment of the clearance control ring may have a forked end and slotted end. The forked end may interlock with the slotted end of an adjacent segment of the clearance control ring to form a full hoop.

In another refinement, a plurality of carriers may be mounted onto the clearance control ring and a plurality of seal may be mounted on the carriers.

In a further refinement, the carriers may be slidably mounted onto the clearance control ring.

In another further refinement, each seal may be unitary with a carrier.

In another refinement, the clearance control ring may include a bridge between each pair of control ring segments and a fastener may secure each bridge to one interlocked pair of control ring segments.

In accordance with another aspect of the disclosure, a gas turbine engine is disclosed. The gas turbine engine may include a rotor having a plurality of radially outwardly extending blades from the rotor. The engine may also include a clearance control ring surrounding the radially extending blades of the rotor. The clearance control ring may be segmented into at least two segments.

In a refinement, the rotor may be provided in a compressor stage of the engine.

In another refinement, the rotor may be provided in a turbine stage of the engine.

In another refinement, the rotor may include multiple stages of blades aligned axially along the engine. A separate clearance control ring may surround each stage of blades and each clearance control ring may be segmented into at least two segments.

In yet another refinement, the engine may further include a plurality of carrier mounted onto the clearance control ring and a plurality of seals, where each seal is mounted on one of the carriers.

In a further refinement, the carriers may be slidably mounted onto the clearance control ring.

In another further refinement, the seal may be unitary with one of the carriers.

In yet another refinement, the rotor and clearance control ring may be surrounded by a split case.

In accordance with yet another aspect of the disclosure, a method of assembling a clearance control ring into a gas turbine engine is disclosed. The method may include interlocking a second segment of the clearance control ring with the first segment of the clearance control ring to create a joint between the adjacent segments of the clearance control ring, continuing the interlocking step until a full hoop clearance control ring circumscribes the engine rotor, and securing a case of the engine around the assembled clearance control ring.

In a refinement, the method may further include mounting a plurality of carrier on the clearance control ring and mounting a seal on each carrier.

In a further refinement, the mounting of the carriers on the clearance control ring may include sliding the carriers onto the segments of the clearance control ring.

In another refinement, the method may further include mounting a plurality of unitary carriers and seals on the clearance control ring.

In yet another refinement, the method may further include loading the clearance control ring to prevent ovalization and disengagement of the segments of the clearance control ring.

In still another refinement, the method may further include inserting a bridge and a fastener through each joint of the clearance control ring.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
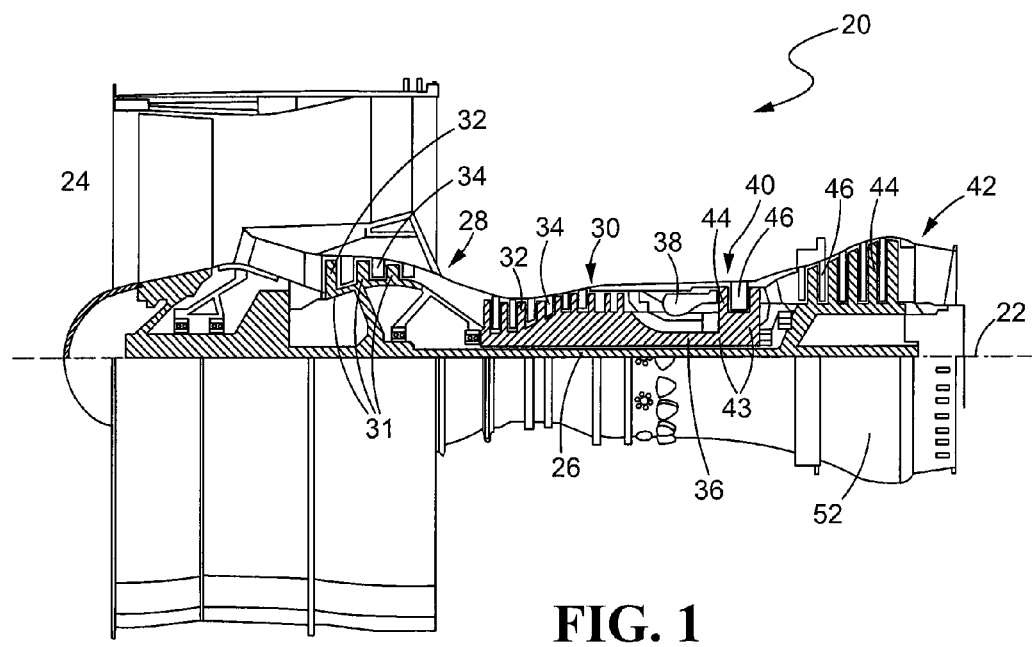
FIG. 1 is a partial cross-sectional view of a gas turbine engine constructed in accordance with an embodiment of the present disclosure.

Referring now to the drawings, and with specific reference to FIG. 1, a gas turbine engine constructed in accordance with the present disclosure is generally referred to by reference numeral 20. The gas turbine engine 20 includes a plurality of components axially aligned along a longitudinal axis 22 is depicted. Starting with fan 24, it is shown to be positioned at a forward end of the engine 20 and mounted for rotation on a first shaft 26 to draw air into the engine 20. A low-pressure compressor 28 and a high-pressure compressor 30 are positioned downstream from the fan 24. As used herein, "downstream" means further along the air flow path through the engine 20.

Each of the compressors 28, 30 include a plurality of stages 31, where each stage 31 includes a plurality of radially outwardly extending and rotating blades 32, collectively forming a rotor 33, and a plurality of radially inwardly extending and stationary vanes 34 collectively forming a stator 35. The rotor blades 32 of the low-pressure compressor 28 rotate about the longitudinal axis 22 on the first shaft 26, while the rotor blades 32 of the high-pressure compressor 30 rotate around the longitudinal axis 22 on a second shaft 36 concentrically mounted around the first shaft 26. As the rotor blades 32 of each of the compressors 28, 30 rotate, the air drawn into the engine 20 by the fan 24 is compressed.

Downstream of the high-pressure compressor 30 is a combustor 38, where the compressed air of the high-pressure compressor 33 is received and combusted along with a fuel. This produces an exhaust that exits the combustor 38 and flows downstream into a high-pressure turbine 40 and then into a low-pressure turbine 42. Each of the turbines 40, 42 have a plurality of stages 43, where each stage includes a plurality of radially outwardly extending rotating blades 44 collectively forming a rotor 45, and a plurality of radially inwardly extending and stationary vanes 46 collectively forming a stator 47. The rotor blades 44 of the high-pressure turbine 40 rotate about the longitudinal axis 22 on the second shaft 36, while the rotor blades 46 of the low-pressure turbine 42 rotate about the longitudinal axis 22 on the first shaft 26. As the exhaust from the combustor 38 expands through the turbines 40, 42, the exhaust impinges upon the rotor blades 46 forcing the rotor blades 46 to rotate. This rotation is mechanically communicated via the shafts 26, 36 to the compressors 28, 30 and the fan 24. As a result, when the exhaust exits the engine 20 through the turbines 40, 42 of the engine 20, not only is thrust created, but the fan 24 and compressors 28, 30 are rotated to draw in and compress more air to continue the cycle.

Figure 2:
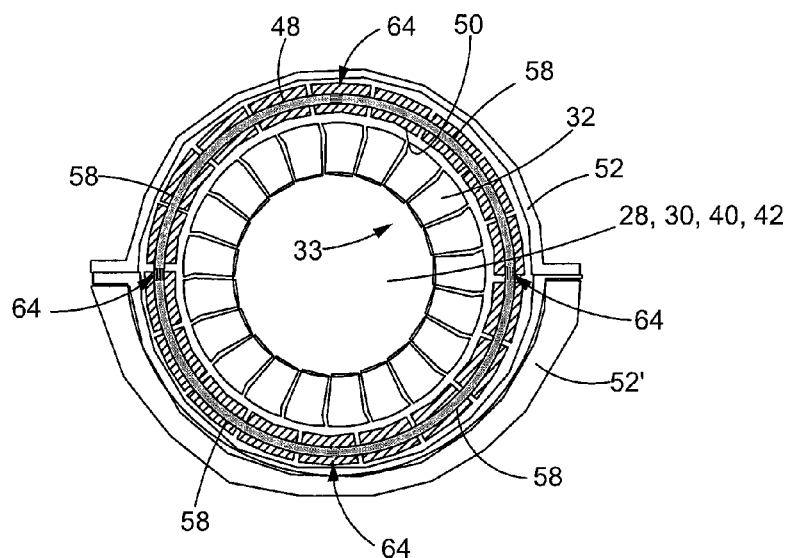
FIG. 2 is a lateral cross-sectional view of a rotor, rotor case, and clearance control ring constructed in accordance with an embodiment of the present disclosure, and depicted in a fully assembled configuration.

Turning now to FIG. 2, since full compression of the air entering into the engine 20 is desired for efficient operation of the engine 20, a clearance control ring 48 having a seal 50 is placed around the rotor blades 32 of each stage 31 of the compressors 28, 30. The control ring 48 is positioned within a case 52 surrounding each compressor 28, 30. In so doing, the volume of air bypassing the rotor blades 32 is reduced. In a similar fashion, a clearance control ring 48 and seal 50 is also placed around the rotor blades 44 of the turbines 40, 42 to also limit the volume of exhaust bypassing the blades 44. This in turn increases the amount of energy which is drawn from the exhaust.

While the seal 50 may be mounted directly on the control ring 48, this is not always the case. For example, in the embodiment of FIGS. 5-7, the seal 50 is mounted on a carrier 54 which is mounted on the clearance control ring 48. More specifically, as shown best in FIG. 7, the carrier 54 may slidably surround the control ring 48 and include rails 55 adapted to slidably receive the seal 50. This may be most advantageous in conjunction with turbines 40, 42, since in such a situation, the seal 50 is exposed to high temperatures while the carrier 54 is not. Such separation reduces costs as only the seal 50 may need to be constructed of materials to withstand high temperatures. The seals 50 and carriers 52 for compressors 28, 30 however, do not need this separation as the compressors 28 and 30 are not objected to such extremely high temperatures. While the foregoing provides two arrangements of the seals 50 and carriers 54, this is in no way limiting, and the separate carriers 54 and seals 50 may be used with compressors 28, 30, and the unitary seals 50 and carriers 52 may be used with turbines 40, 42, as well.

Figure 3:
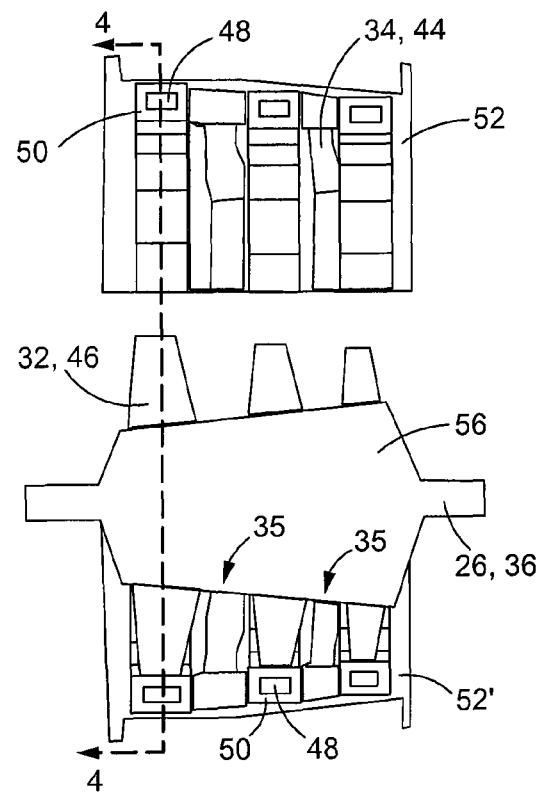
FIG. 3 is a longitudinal cross-sectional view of a rotor, rotor case, and clearance control ring constructed in accordance with another embodiment of the present disclosure and depicted in a partially assembled configuration.
Figure 4:
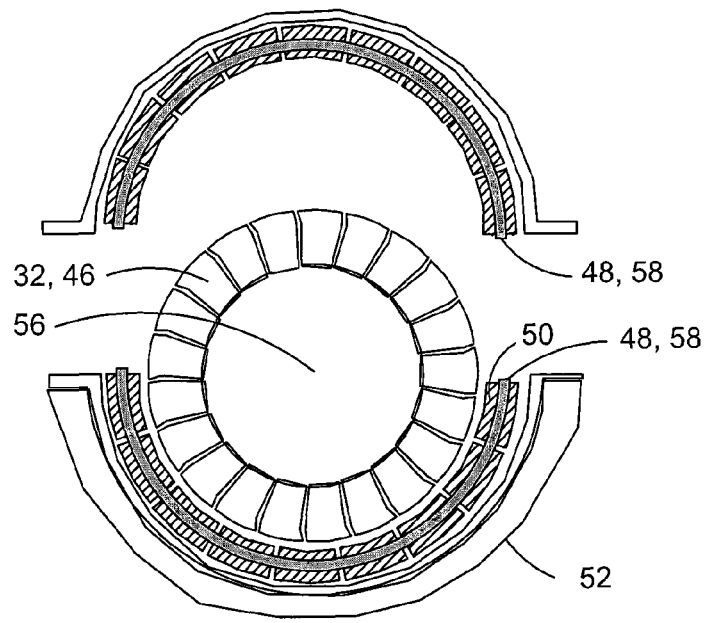
FIG. 4 is a cross-sectional view of the rotor and rotor case of FIG. 3 taken along the line 4-4 of FIG. 3.

Returning again to FIGS. 3 and 4, the case 52 surrounding the compressors 28, 30 and turbines 40, 42 may be split into separate segments depicted as 52 and 52'. Such a split or segmented case design allows easier access to the compressors 28, 30 and turbines 40, 42 for maintenance and allows for one-piece pre-assembled multi-stage rotors 56 to be installed and removed, rather than requiring rotors to be installed and removed stage-by-stage. In order to preserve this advantage over one-piece cases, the clearance control ring 48, seals 50, and carriers 52 of the present disclosure are also to be segmented. This represents a significant improvement over the prior art in that prior art control rings are all single, unitary pieces.

Figure 5:
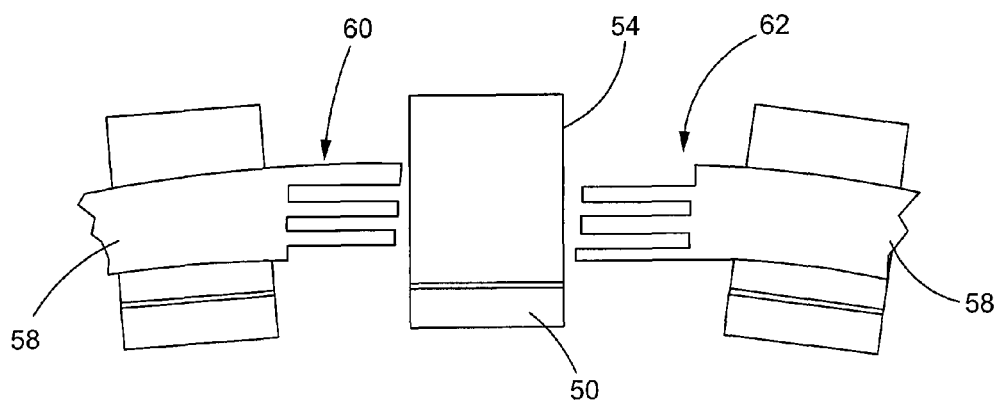
FIG. 5 is a fragmentary side view of a segmented clearance control ring joint constructed in accordance with another embodiment of the present disclosure and depicted in an un-assembled configuration.
Figure 6:
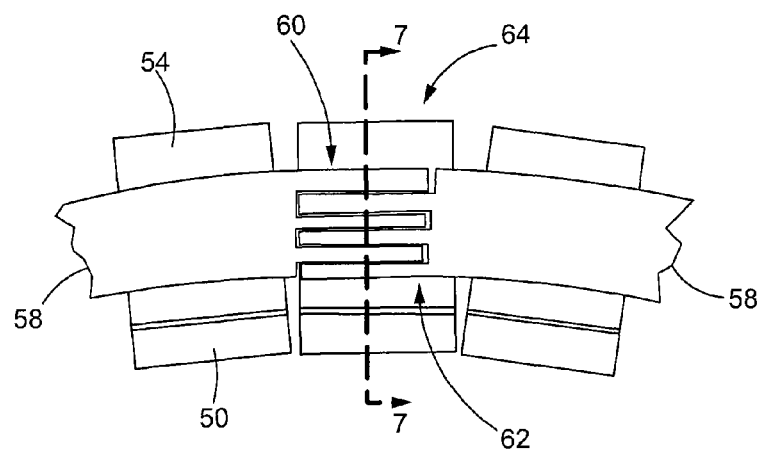
FIG. 6 is a fragmentary side view of the segmented clearance control ring joint of FIG. 5, but depicted in a fully assembled configuration.
Figure 7:
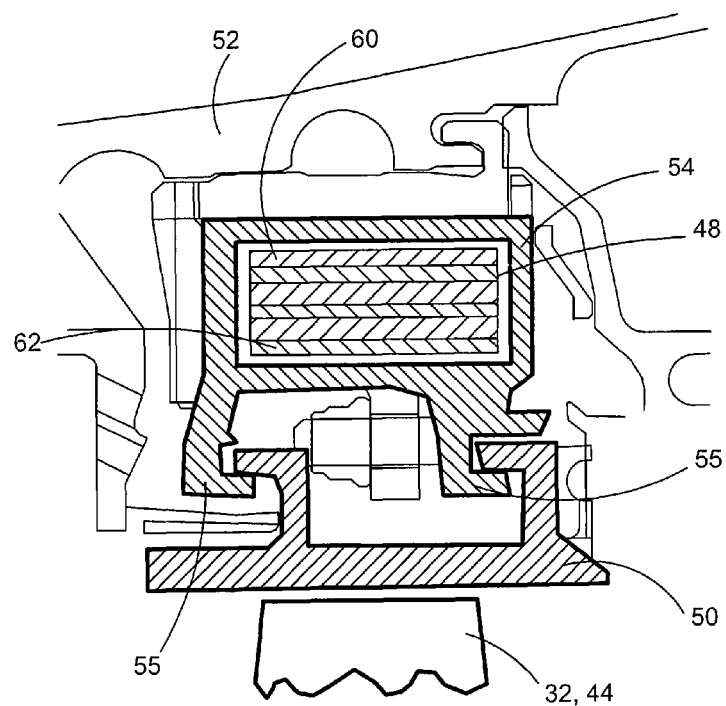
FIG. 7 is a cross-sectional view of the segmented clearance control ring joint of FIG. 6 taken along the line 7-7 of FIG. 6.

While segmenting the control ring 48 does allow for use of one-piece pre-assembled rotors 56, to insure that the clearance control ring 48 resists ovalization and otherwise behaves like a full hoop clearance control ring, the clearance control ring 48 is constructed of specifically shaped, and separate segments 58, each of which must be interlocked with adjoining segments 58. In one embodiment, as can be seen in FIGS. 5-7, each segment 58 of the clearance control ring 48 has a forked end 60 and a slotted end 62. Each forked end 60 interlocks with the slotted end 62 of an adjoining segment 58 in a tongue and groove arrangement. Once so interlocked, each mated pair of segments forms a joint 64. These interlocking joints 64 allow the segmented clearance control ring 48 to resist ovalization and to behave as a full hoop clearance control ring by structurally reinforcing the control ring 48. While the segments 58 of the clearance control ring 48 are described herein as having forked end 60, and slotted end 62, this is not to be limiting as other forms of joints are possible so long as each segment 48 is interlocked with adjacent segments 48.

To further enhance the structural capability of the clearance control ring 48, it may be loaded in a radially inward direction. By applying pressure toward the rotor 56, the clearance control ring 48 is further buttressed against disengagement. This loading of the clearance control ring 48 may be effectuated by assembling the segments 58 of the clearance control ring 48 in such a manner so that the interlocking nature of the segments 58 creates a tension across the joint 64 and holds the segments 58 in a full hoop configuration. Alternatively, the loading may be caused by the installation of the seals 50 and/or the carriers 54. Other methods of loading the clearance control ring 48 include providing an external force on the clearance control ring 48 such as by, but not limited to, directing a fluid surrounding the clearance control ring 48, using springs, providing mechanical stops, or the like.

Figure 8:
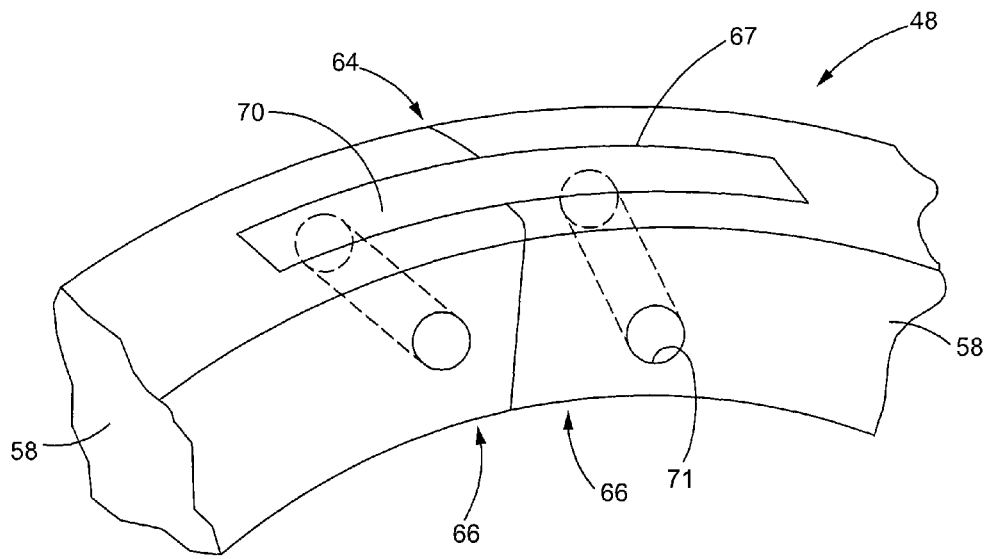
FIG. 8 is a fragmentary perspective view of another embodiment of a segmented clearance control ring joint constructed in accordance with the present disclosure.

In another embodiment, depicted in FIG. 8, each segment 58 of the clearance control ring 48 may be interlocked by providing each segment 58 with a cleft end 66 which abuts the cleft end 66 of an adjoining segment 58 of the clearance control ring 48 and thereby creates a cavity 67 within the abutting cleft ends 66. A bridge 70 may then be inserted in the cavity 67 and be secured with a fastener 71 or the like. Thus, it can be seen that such an arrangement interlocks the adjoining segments 58 of the clearance control ring 48 and secures the joint 64. In such an embodiment, the fasteners 71 retain the segments 58 of the clearance control ring 48 in a full hoop configuration, and thus the clearance control ring 48 may not need to be loaded. However, the clearance control ring 48 may still be loaded as described above to reduce wear on, and extend the life of, the fasteners 71. The above description of FIG. 8 is only one embodiment which includes fasteners 71, but this description should in no way be considered as limiting the scope of the present disclosure. Other forms of fasteners 71 including, but not limited to, screws, rivets, bolts and welds may be used to secure the segments 58 of the clearance control ring 48 together, with or without loading of the clearance control ring 48.

Figure 9:
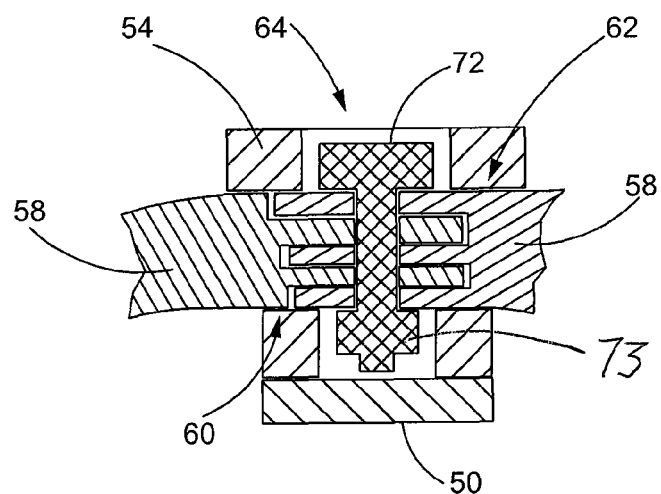
FIG. 9 is a sectional view of a clearance control ring joint constructed in accordance with another embodiment of the present disclosure using a threaded fastener radially extending through the joint.
Figure 10:
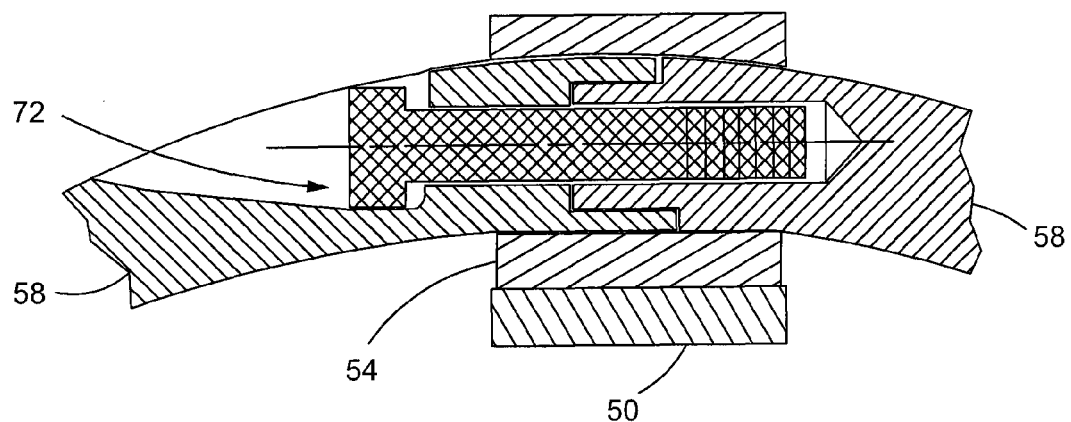
FIG. 10 is a sectional view of a another embodiment of a clearance control ring joint constructed in accordance with the present disclosure but using a threaded fastener tangentially extending through the joint.

In a similar manner to that of FIG. 8, the embodiment presented in FIGS. 2-7 may also include a bolt 72 and associated nut 73 that secure the segments 58 of the clearance control ring 48 at the joint 64. As illustrated in FIG. 9, the bolt 72 may radially extend through the joint 64 to secure the forked end 60 and slotted end 62 or, as illustrated in FIG. 10, the bolt 72 may tangentially extend through the joint 64 to secure the forked end 60 and slotted end 62. It is also envisioned that a fastener 71 or bolt 72 may secure a split-collar clamp or the like surrounding the joint 64 in order to retain the ends 60, 62 of the clearance control ring 48 segments 58 in an interlocked position. These are only some embodiments that use a fastener 71 or bolt 72 to secure the joint 64 in the clearance control ring 48, and others are surely possible.

In order to assemble the foregoing, the carriers 54, or the unitary carriers 54 and seals 50, may be mounted on the clearance control ring 48 first. In one embodiment, the carriers 54 may be slidably mounted on the clearance control ring 48, as shown best in FIG. 7. However, any method of mounting the carriers 54 is possible, and is not limited to only this exemplary embodiment. Next, for separate carriers 54 and seals 50, the seals 50 may be mounted on the carriers 54 using the rails 55 as also shown in FIG. 7. Other forms of attachment are certainly possible. Each segment 58 of the clearance control ring 48 is then interlocked with adjoining segments 58 around a rotor 33, 35 of the compressor 28, 30 or turbine 40, 42 until a full hoop is formed. If the compressor or turbine has multiple stages, such as those of FIG. 3, multiple clearance control rings 48 may be assembled at the same time, each around a separate rotor 33, 45, such as would be done with a one-piece assembled multi-stage bladed rotor 56. The case 52 may then be secured around the clearance control ring 48 to complete the assembly. This is merely one exemplary method for assembling a clearance control ring 48 and other assembly methods exist.

In operation, the clearance control ring 48 expands or contracts with the rotor 56 around which the clearance control ring 48 is surrounding. This is accomplished by heating or cooling the clearance control ring 48 as necessary. This heating may be done by redirecting a flow of air/exhaust from a compressor 28, 30 or turbine 40, 42 to impinge upon the clearance control ring 48. High-temperature air/exhaust causes the clearance control ring 48 to expand, while low-temperature air/exhaust causes the clearance control ring 48 to contract. Such expansion and contraction can be controlled by controlling the amount of air/exhaust impinging upon the clearance control ring 48, and by controlling the location from which the air/exhaust is being diverted. The rate of expansion and contraction may also be dictated by the materials used in constructing the clearance control ring 48. The materials can be chosen to allow for a specific rate of expansion and contraction to occur, depending on the temperature conditions in the engine 20. The clearance control ring 48 may therefore expand and contract with the rotors of the compressor 28, 30 or turbine 40, 42 to maintain the necessary distance between the seals 50 and the blades 32, 46 throughout operation of the engine 20.

The segmented design of the clearance control ring 48 also allows for easier repair or replacement of individual seals 50 or carriers 54 than in prior art clearance control rings. Since only the segment 58 of the clearance control ring 48 which has the damaged seal 50 or carrier 54 needs to be removed, the time required for disassembly and reassembly of the engine 20 is therefore reduced. Moreover, as the control ring 48 and carrier 54 slide, clip or otherwise removeably attach together, and the seals 50 clip, slide or otherwise removeably attach to the carrier, removal of each component, and only the component in question, is facilitated.

INDUSTRIAL APPLICABILITY

From the foregoing, it can be seen that the technology disclosed herein has industrial applicability in a variety of settings such as, but not limited to, maintaining a desired blade clearance for rotors of split case configured gas turbine engines. The segmented clearance control ring described herein can be assembled with split cases and with one-piece pre-assembled multi-stage rotors, whereas prior art full hoop clearance control rings require stage-by-stage assembly of rotors. The segmented clearance control ring also allows maintenance to be performed on individual seals or carriers without disassembling the entire compressor or turbine.

While the present disclosure has been in reference to a gas turbine engine and specifically to clearance control rings for rotors in such an engine, one skilled in the art will understand that the teachings herein can be used in other applications as well such as, but not limited to, providing a constant seal for parts which have varying diameters during operation. It is therefore intended that the scope of the invention not be limited by the embodiments described presented herein as the best mode for carrying out the invention, but rather that the invention include all equivalents falling within the spirit and scope of the appended claims as well.

What is claimed is:

1. A clearance control ring for a rotor, comprising:
   a first control ring segment
   a second control ring segment interlocked with the first control ring segment to form a full hoop clearance control ring, each segment of the clearance control ring having a forked end and a slotted end, each forked end interlocking with the slotted end of an adjacent segment to form a joint of the full hoop; and
   a plurality of carriers mounted onto the clearance control ring and a plurality of seals are mounted on the carriers.

2. The clearance control ring of claim 1, wherein the carriers are slidably mounted onto the clearance control ring.

3. The clearance control ring of claim 1, wherein each seal is unitary with a carrier.

4. The clearance control ring of claim 1, further including a bridge between each pair of control ring segments and a fastener securing each bridge to one interlocked pair of the control ring segments.

5. The clearance control ring of claim 1, further comprising: a fastener that extends through the joint to secure the forked end and the slotted end.

6. A gas turbine engine, comprising:
   a rotor having a plurality of radially outwardly extending blades;
   a clearance control ring surrounding the radially extending blades of the rotor, the clearance control ring being segmented into at least two segments, each segment of the clearance control ring having a forked end interlocking with a slotted end of an adjacent segment to form a joint; and
   a fastener that extends through the joint.

7. The engine of claim 6, wherein the rotor is provided in a compressor stage of the engine.

8. The engine of claim 6, wherein the rotor is provided in a turbine stage of the engine.

9. The engine of claim 6, wherein the rotor includes multiple stages aligned axially along the engine and a separate clearance control ring surrounds each stage, each clearance control ring being segmented into at least two segments.

10. The engine of claim 6, wherein the engine further comprises:
    a plurality of carriers mounted onto the clearance control ring; and
    a plurality of seals, each seal being mounted on one of the carriers.

11. The engine of claim 10, wherein the carriers are slidably mounted onto the clearance control ring.

12. The engine of claim 10, wherein each seal is unitary with one of the carriers.

13. The engine of claim 6, wherein the rotor and clearance control ring are surrounded by a split case.

14. A method of assembling a clearance control ring into a gas turbine engine, comprising:
    positioning a first control ring segment proximate a rotor of the gas turbine engine;
    interlocking a second segment of the clearance control ring with the first segment of the clearance control ring to create a joint between the adjacent segments of the clearance control ring;
    inserting a fastener through the joint;
    continuing the interlocking step until a full hoop clearance control ring circumscribes the engine rotor; and
    securing a case of the engine around the assembled clearance control ring.

15. The method of claim 14, further comprising mounting a plurality of carriers on the clearance control ring and mounting a seal on each carrier.

16. The method of claim 15, wherein mounting the carriers on the clearance control ring entails sliding the carriers onto the segments of the clearance control ring.

17. The method of claim 14, further comprising mounting a plurality of unitary carriers and seals on the clearance control ring.

18. The method of claim 14, further comprising loading the clearance control ring to prevent ovalization and disengagement of the segments of the clearance control ring.

19. The method of claim 14, further comprising inserting a bridge and a fastener through each joint of the clearance control ring.

* * * * *